United States Patent [19]

Ikegami

[11] 4,208,923
[45] Jun. 24, 1980

[54] DRIVE MECHANISM FOR A FOUR-WHEEL-DRIVING TRACTOR

[75] Inventor: Seiichi Ikegami, Sakai, Japan

[73] Assignee: Kubota, Ltd., Osaka, Japan

[21] Appl. No.: 827,639

[22] Filed: Aug. 25, 1977

[30] Foreign Application Priority Data

Jun. 11, 1977 [JP] Japan .................................. 52-69090

[51] Int. Cl.² ............................................ F16H 37/00
[52] U.S. Cl. ................................. 74/15.63; 74/700; 74/665 G; 74/665 K
[58] Field of Search .................. 74/15.66, 15.2, 15.4, 74/15.6, 15.63, 15.86, 11, 655 G, 665 K, 700, 701; 192/48.8; 180/44 R, 49, 50, 51, 52, 54D

[56] References Cited

U.S. PATENT DOCUMENTS

| | | | |
|---|---|---|---|
| 2,661,634 | 12/1953 | Bechman et al. | 74/15.63 |
| 2,975,656 | 3/1961 | Haverlender | 74/15.63 |
| 3,733,912 | 5/1973 | Muryama et al. | 74/15.4 |
| 3,897,699 | 8/1975 | Hoyer | 74/701 |
| 3,916,711 | 11/1975 | Hoyer | 74/701 |
| 4,023,418 | 5/1977 | Zenker | 74/15.86 |
| 4,116,090 | 9/1978 | Zenker | 74/665 G |

FOREIGN PATENT DOCUMENTS

| | | | |
|---|---|---|---|
| 17357 | 9/1955 | Fed. Rep. of Germany | 74/700 |
| 948763 | 8/1956 | Fed. Rep. of Germany | 74/700 |
| 192260 | 10/1957 | Fed. Rep. of Germany | 74/700 |
| 1216245 | 4/1960 | France | 74/15.4 |
| 792083 | 3/1958 | United Kingdom | 74/15.86 |

Primary Examiner—Samuel Scott
Assistant Examiner—Wesley S. Ratliff, Jr.
Attorney, Agent, or Firm—Edwin E. Greigg

[57] ABSTRACT

Drive mechanism for a four-wheel-drive tractor, comprising a pair of input shafts in double tube construction with one fitted to nest in the other, main gearing shaft assembly, differential gearing, front-wheel-drive-shaft assembly, gearing wheels provided in both frontal and rear portions of the front-wheel-drive-shaft assembly, a power-take-off shaft and a drive shaft-assembly. Driving power taken out from the gearing wheel provided in front portion of the front-wheel-drive-shaft assembly is transmitted to front wheels via a transmission shaft with a mating gear, disposed at an underbelly portion of the tractor. The drive assembly is provided above the differential gearing. With this construction, the front-wheel-drive-shaft can be made short, sufficient empty space height can be provided in the underbelly portion of the tractor, and the transmission housing can be minimized.

5 Claims, 5 Drawing Figures

DRIVE MECHANISM FOR A FOUR-WHEEL-DRIVING TRACTOR

BACKGROUND OF THE INVENTION

This invention relates to drive transmission mechanism for a four-wheel-drive tractor where the dirigible front wheels as well as the rear wheels are all of drivable construction and a power-take-off shaft is provided in a rear portion of the transmission housing which bears the rear wheel assembly.

It is generally the practice in four-wheel-drive tractors, for properly adapting the rotation speed of the front wheels to that of the rear wheels, to transmit to the front wheels the power taken out from rear end of the rear-wheel-driving main gearing shaft assembly, and there has conventionally been adopted the construction where a long transmission shaft extending from the rear end of the main gearing shaft assembly to the front wheels is suspended in a space under the vehicle body. It has thus been hard to provide sufficient empty space height above the ground in the underbelly portion of the tractor. Moreover, as the transmission shaft becomes inevitably long, the shaft must be of large diameter for realizing sufficient transmission strength, thus making the space in the underbelly portion of the tractor all the more narrower, and adoption of the large-diameter shaft incurs increase in weight as well.

Incidentally, when the power-take-off shaft is provided in the rear portion of the transmission housing, the drive assembly is needed in addition to running travel gearing shaft assembly in the transmission housing, thus apt generally to require larger transmission housing because of the increased number of the accommodated shafts. When the housing becomes thus larger, it is preferable to provide entirety of such housing as low as possible for stability of the vehicle, but such contradicts securing sufficient height of empty space below the underbelly of the vehicle body.

SUMMARY OF THE INVENTION

Primarily, the object of this invention is to provide such rational improvements in the drive transmission mechanism with diverging outputs to the front wheels, rear wheels and power-take-off shaft, as to make it possible to shorten the front-wheel-drive-shaft, to secure sufficient height of empty space below the underbelly portion of the vehicle and to minimize the transmission housing.

In order to attain the object, the drive transmission mechanism for a four-wheel-drive tractor comprises in accordance with this invention: a pair of input shafts in double tube construction with one fitted to nest in the other, disposed to extend longitudinally of the tractor in an upper part within a transmission housing for receiving driving power from an engine, independently of each other; main gearing shaft means extending along and underneath the input shafts; differential gearing for rear wheels, provided in a rear portion of the travel speed change shaft means and operatively connected to the outer input shaft via the main gearing shaft means; front-wheel-drive-shaft means disposed to extend longitudinally of the tractor underneath the travel speed change shaft means; a gearing wheel provided in a rear portion of the front-wheel-drive-shaft means and operatively connected to the travel speed change shaft means; a power-take-off gearing wheel provided in a frontal portion of the front-wheel-driving-shaft means for transmitting the power to front wheels via a mating gear on a transmission shaft disposed at an underbelly portion of the tractor; a power-take-off shaft provided in a portion spaced rearwardly of the differential gearing; and a drive-shaft means provided above the differential gearing, for transmitting the power from the inner input shaft to the power-take-off shaft.

Power to the front wheels can thus be taken out from the frontal gear of the front-wheel-drive-shaft means journaled at the bottom portion within the transmission housing, to extend longitudinally of the tractor, and so the transmission shaft to transmit the rotation of this frontal gear to the front wheels is far shorter than the conventional transmission shaft taking out the power directly from the rear end of the main gearing shaft means and transmitting same to the front wheels; consequently minimizing the space occupied by the transmission shaft in the underbelly portion of the vehicle, and thus providing ample empty space there. Moreover, since the transmission shaft can be made short, the shaft itself need no longer be of larger diameter, which contributes also to reducing the space occupied by this shaft. Furthermore, since the input shaft for running and the input shaft for the power-take-off shaft are in double tube construction, the space occupied by the shafts within the transmission housing is reduced in comparison with the case where the driving power is distributed in divergence from an input shaft to the running travel gearing system and the power-take-off-shaft-driving system; thus making it possible to realize compact transmission structure and accordingly to dispose the transmission housing comparatively high above the ground without increasing the center of gravity of the overall vehicle; as a result making it easy to secure sufficient empty space below the underbelly portion of the vehicle. Moreover, since the power-take-off-shaft-driving-shaft means is accommodated in the upper portion of the transmission housing, the front-wheel-drive-shaft means can be disposed underneath the main gearing shaft means quite close thereto, which contributes also to providing large empty space in the underbelly portion of the vehicle. Using the ample space thusly provided in the underbelly portion of the vehicle, it has now been made easy to mount front and-/or side attachments.

BRIEF DESCRIPTION OF THE DRAWINGS

The drawings show, by way of example, an embodiment of the drive transmission mechanism for a four-wheel-driving tractor, according to this invention, in which.

DESCRIPTION OF THE PREFERRED EMBODIMENT

Figure 1:
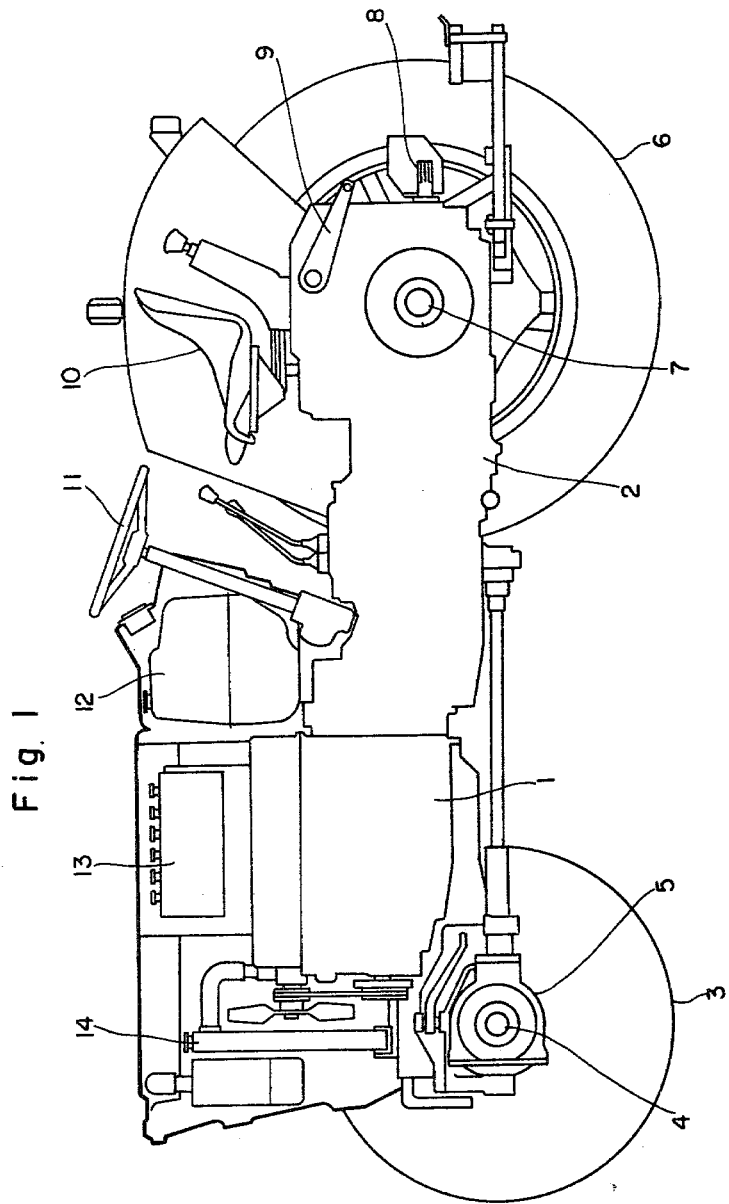
FIG. 1 is a side elevation of the tractor with the wheels on the side near the viewer taken away for clear view.
Figure 2:
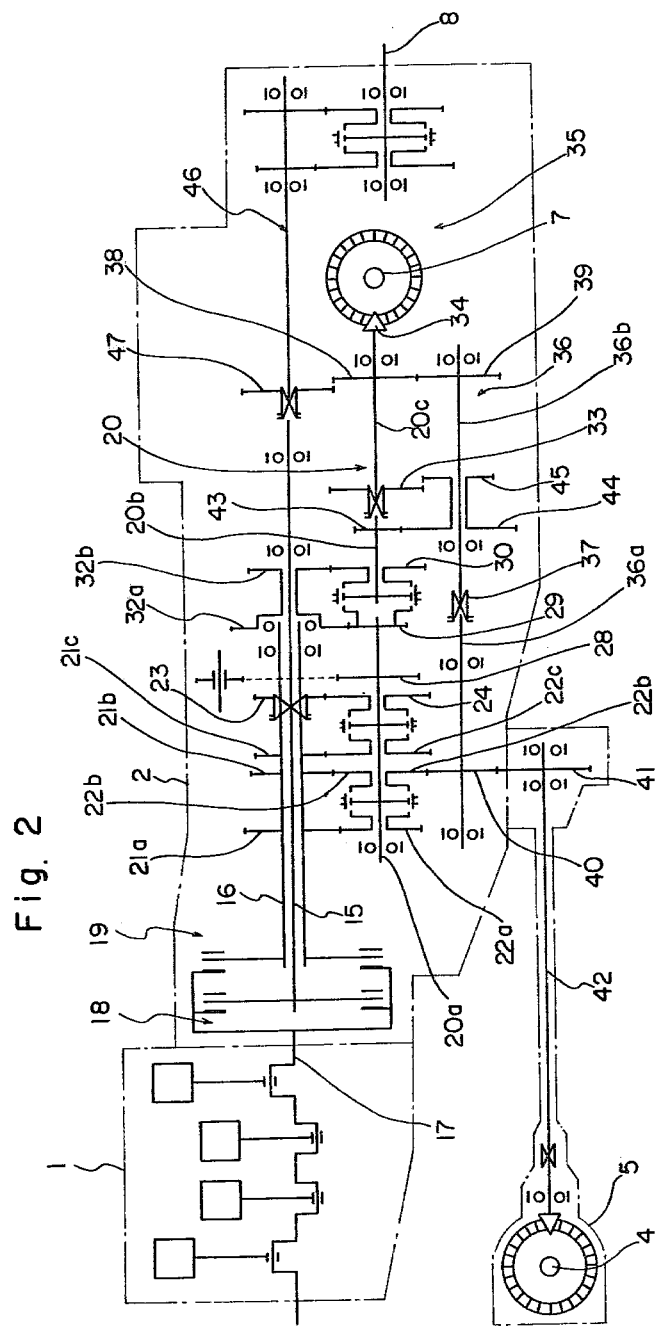
FIG. 2 is a schematic driving system diagram.
Figure 3:
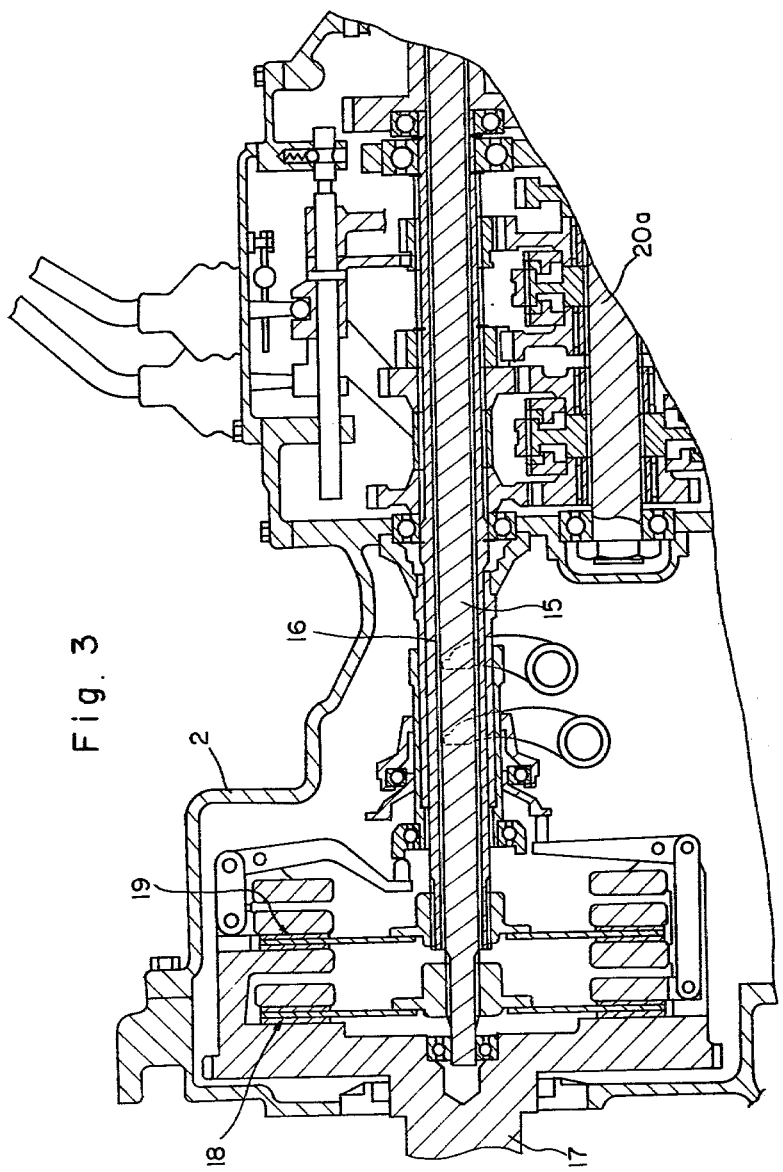
FIG. 3 is a side elevation, in vertical section, of a frontal portion of the drive transmission mechanism.
Figure 4:
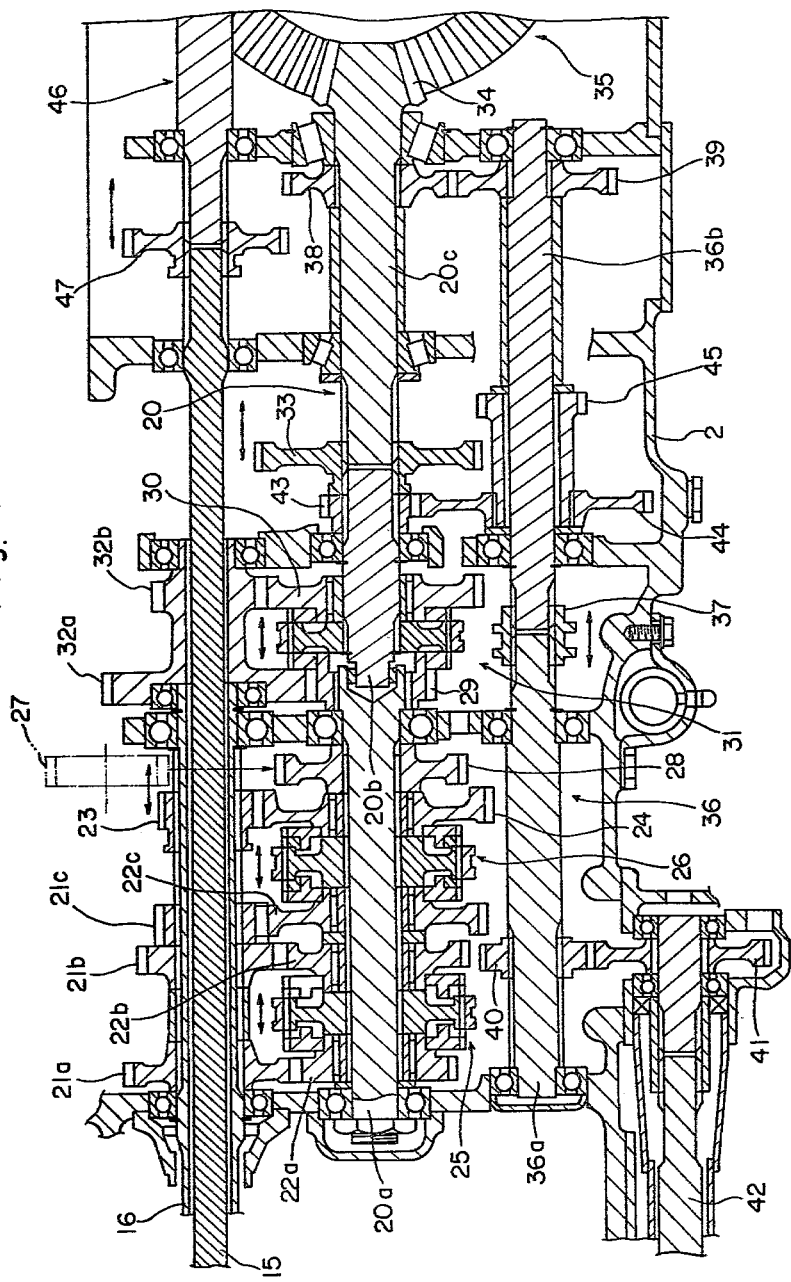
FIG. 4 is a side elevation, in vertical section, of an intermediary portion of the drive transmission mechanism.
Figure 5:
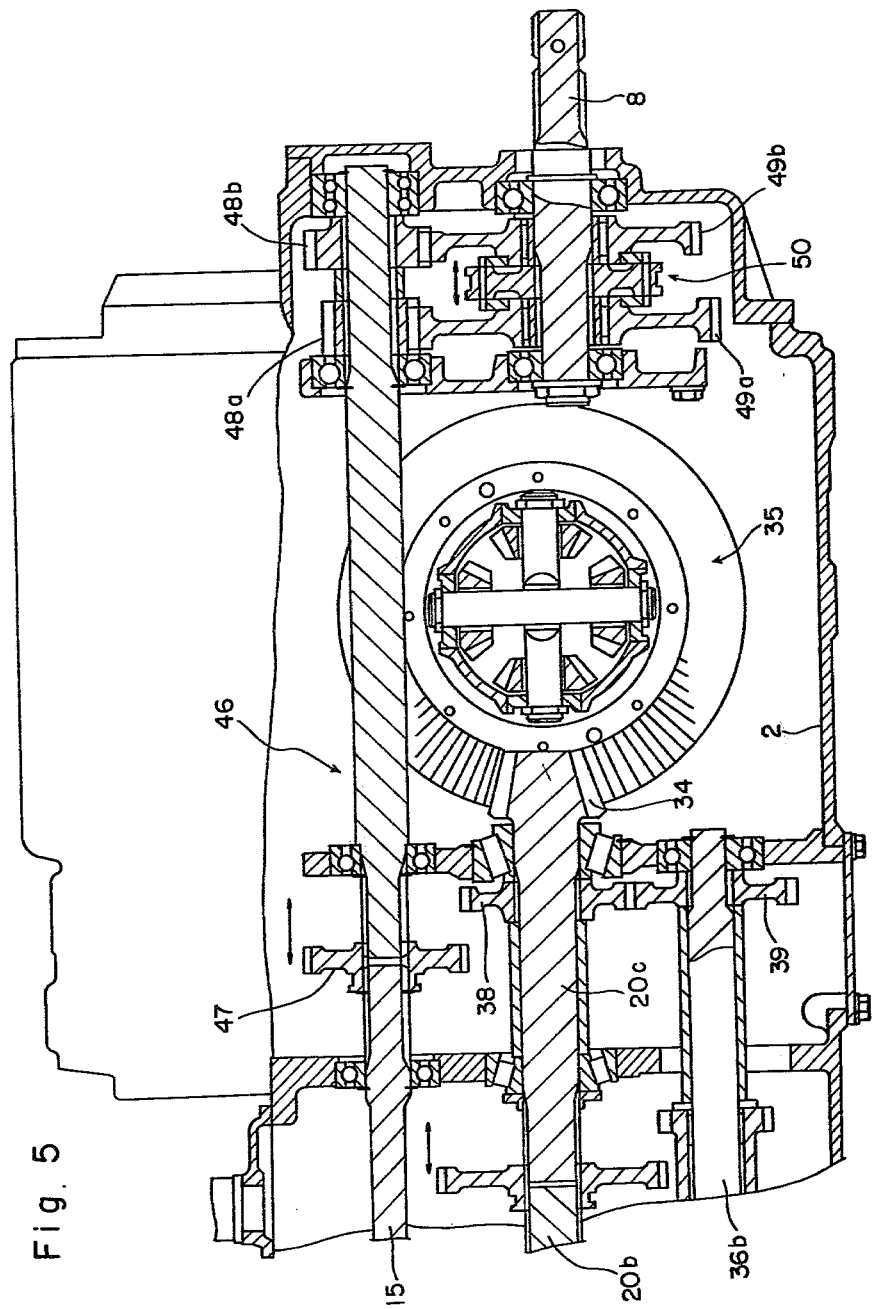
FIG. 5 is a side elevation, in vertical section, of a rear portion of the drive transmission mechanism.

Description is now given hereunder with respect to a preferred embodiment of this invention, referring to the accompanying drawings:

FIG. 1 shows an overall side elevation of the front-wheel-driving tractor, and there are illustrated: an engine at 1, a transmission housing at 2, a dirigible front wheel at 3, axle therefor at 4, front differential gearing case at 5, a rear wheel at 6, axle therefor at 7, a power-take-off shaft for driving any optional attachment at 8, a lift-arm for raising and lowering the attachment at 9, operator's seat at 10, steering wheel at 11, fuel tank at 12, battery assembly at 13, and radiator at 14.

Description is now given hereunder with respect to drive mechanism for transmission to the rear wheels 6, front wheels 3 and power-take-off shaft 8, referring to FIGS. 2 through 5:

Shown in the drawings at 15 and 16 are two input shafts in double tube construction with one fitted to nest in the other, disposed to extend longitudinally of the tractor in an upper part with the transmission housing 2, the outer shaft 16 being used as input shaft for running travel and the inner shaft 15 for the power-take-off. Friction plate type clutches 18 and 19 are each provided at the front end of the input shafts 15 and 16, respectively, for receiving the power from engine output shaft 17, independently of each other.

A first, a second and a third gearing shafts 20a, 20b and 20c, constituting travel speed change shaft means 20, are journaled to extend along and underneath the input shafts 15, 16, coaxially with one another, allowing relative rotation with respect to each other. On to the first gearing shaft 20a there are loosely fitted: three gears 22a, 22b and 22c in constant mesh with mating gears 21a, 21b and 21c, respectively, all these latter being splined onto the outer input shaft 16; as well as another gear 24 engageable to mesh with a shift gear 23 also splined onto the outer input shaft 16; with synchromesh gears 25 and 26 interposed in between the gears 22a and 22b and in between the gears 22c and 24, respectively, making it possible to shift the forward rotation speed of the first gearing shaft 20a in four steps (forward speed change) by selectively operating the synchromesh gears 25 and/or 26. Further on the first gearing shaft 20a there is fixed a gear 28 which constantly meshes with a reversing gear 27 journaled on a separate shaft, making it possible to shift the reverse rotation speed of the first gearing shaft 20a (reverse speed change) by bringing the shift gear 23 into meshing engagement with this reversing gear 27. Still further, a small-diameter gear 29 is splined on rear end of the first gearing shaft 20a, while a large-diameter gear 30 is loosely fitted on frontal end of the second gearing shaft 20b, and a synchromesh gear 31 is interposed in between these two gears 29 and 30. Supported on outer bearing race at rear extremity of the outer input shaft 16 is a ganged set of two integral gears 32a and 32b in constant mesh with the said gears 29 and 30, respectively; thus providing an auxiliary speed changer mechanism for transmitting the rotation of the first gearing shaft 20a to the second gearing shaft 20b in two-step shifting of higher and lower speeds by means of operating the synchromesh gearing 31. Furthermore, a shift gear 33 is provided to be slidable between one position where it bridges over rear end of the second gearing shaft 20b and frontal end of the third gearing shaft 20c and the other position where it rides only on the third gearing shaft 20c clear from the rear end of the second gearing shaft 20b. Rotation of the third gearing shaft 20c is transmitted, via a bevel gear 34, to differential gearing 35 for driving the rear wheels 6.

Designated generally at 36 is front-wheel-drive-shaft means, which comprises: a first and a second drive shafts 36a, 36b disposed to extend coaxially in opposing relation to each other, for free relative rotation, along and underneath the gearing shafts 20a, 20b and 20c of the gearing shaft means 20; and a clutch 37 constructed as a shaft-coupling in between the opposing ends of these two driving shafts 36a and 36b. On rear end of the rear, second driving shaft 36b there is fixed a gear 39 in constant mesh with a gear 38 fixed on the rearmost, third gearing shaft 20c of the travel speed change shaft means 20, while on frontal end of the front, first driving shaft 36a there is fixed a gear 40 for transmitting the power to the front wheels 3. Namely, the power taken out by this gear 40 is transmitted via a mating gear 41 and a transmission shaft 42 to front differential casing 5, thus for driving the front wheels 3 in accordance with the rear wheels 6; but driving only the rear wheels 6 may as well be possible by disengaging the clutch 37.

On the rear, second drive shaft 36b of the front-wheel-drive-shaft means 36 there is loosely fitted a ganged set of two integral gears, namely: a gear 44 which constantly meshes with a mating pinion gear 43 is fixed on the second gearing shaft 20b of the travel speed change shaft means 20; and a pinion gear 45 selectively engageable with the shift gear 33 when this shift gear 33 is properly slid for such engagement with the pinion gear 45, thus making up extreme reduction gearing for transmitting the rotation from the second gearing shaft 20b to the rearmost third gearing shaft 20c under the extreme reduction. In this way, the second driving shaft 35b of the front-wheel-drive-shaft means 36 is utilized also for the purpose of supporting the extreme reduction gears 44, 45 thus for providing a compact transmission mechanism.

In further extension of the rear end of the inner input shaft 15 there is journaled a power-take-off-shaft-driving-shaft means 46 coaxially with that input shaft 15 for free relative rotation therewith, and the opposing ends of these two shafts 15 and 46 are interconnected by a shift gear 47. Two gears 48a and 48b fixed at rear end portion of the power-take-off-shaft-driving-shaft means 46 are in constant mesh with mating gears 49a and 49b, respectively, loosely fitted on the power-take-off shaft 8; and in between these two gears 49a and 49b there is interposed a synchromesh gearing 50 for realizing two-step shifting of higher and lower speeds of the power-taking-off shaft 8 in a predetermined direction, by operating the synchromesh gearing 50. It is also possible to slide the shaft gear 47 for cutting off the direct connection between the power-take-off-shaft-driving-shaft means 46 and the input shaft 15 and for engaging the shift gear 47 with the gear 38 fixed on the rearmost, third gearing shaft 20c; thus to drive the power-take-off shaft 8 in good conformity with the running speed and running direction of the vehicle. In this way, the shift gear 47 has the dual function of: engaging and disengaging the input shaft 15 and the power-take-off-shaft-driving-shaft 46; as well as engaging and disengaging the power-take-off-shaft-driving-shaft 46 and the rearmost, third gearing shaft 20c of the travel speed change shaft means 20; thus providing a compact transmission mechanism in comparison with the case where separate gear is used for each of the said function.

Though a specific preferred embodiment has been illustrated and described, the main object of this invention may as well be attained even with the main gearing shaft means 20 and the front-wheel-driving-shaft means 36 each comprising a single shaft only.

I claim:

1. A four-wheel drive tractor transmission comprising a transmission housing, outer and inner input shafts in double tube construction having plural speed change gears and disposed to extend longitudinally of said transmission housing, travel speed change shaft means having at least first and second axially aligned gearing shafts extending longitudinally beneath said input shafts, said first and second gearing shafts each being provided with speed change gears, said housing further including differential gearing for driving a set of rear wheels, and a power-take-off shaft disposed rearwardly of the differential gearing and connected to said inner input shaft, said transmission further comprising:
 a power-take-off gear mounted on said second gearing shaft in proximity to said differential gearing,
 front wheel drive shaft means disposed co-extensively with and beneath said travel speed change shaft means, said front wheel drive shaft means provided with front and rear gear means, said rear gear means arranged to engage said power-take-off gear, and
 a forwardly projecting transmission shaft means disposed beneath the front wheel drive-shaft means and a gear mounted on said transmission shaft means arranged to engage a gear disposed on said front wheel drive-shaft means whereby power can be transmitted to a set of front wheels.

2. A four-wheel drive tractor transmission in accordance with claim 1 including a gear mounted on said second gearing shaft, a third gearing shaft axially aligned with said second gearing shaft, a shift gear slidably mounted on said third gearing shaft and two extreme reduction gears loosely mounted on said front wheel drive shaft means, one of said reduction gears being engaged with said gear on said second gearing shaft and the other of said reduction gears being engageable with said shift gear.

3. A four-wheel drive tractor as claimed in claim 2 wherein said travel speed change shaft means further includes a coaxially third gearing shaft connected to said second gearing shaft via a clutch, said last-named shaft including speed change gear means engaged with further speed change gears which are loosely mounted on said front wheel drive-shaft means.

4. A four-wheel drive tractor as claimed in claim 2 wherein said travel speed change shaft means comprises a further coaxially disposed gearing shaft and clutch means supported on said travel speed change shaft means at a point of juncture between said respective gearing shafts.

5. A four-wheel drive tractor transmission comprising a transmission housing, outer and inner input shafts in double tube construction having plural speed change gears and extending longitudinally of said transmission housing, travel speed change shaft means having first, second and third axially aligned gearing shafts extending longitudinally beneath said inner shafts, said first and second gearing shafts each being provided with speed change gears, said housing further including differential gearing for driving a set of rear wheels, and a power-take-off shaft disposed rearwardly of said differential gearing and connected to said inner input shaft,
 a power-take-off gear mounted on said second gearing shaft adjacent to said differential gearing,
 front wheel drive shaft means disposed co-extensively with and beneath said travel speed change shaft means, said front wheel drive shaft means provided with rear gear means arranged to engage said power-take-off gear,
 a gear mounted on the second gearing shaft,
 a shift gear slidably mounted on the third gearing shaft, and
 two extreme reduction gears loosely mounted on said front wheel drive shaft means, one of said reduction gears being engaged with said gear on said second gearing shaft and the other of said reduction gears being engageable with said shift gear.

* * * * *

UNITED STATES PATENT AND TRADEMARK OFFICE
CERTIFICATE OF CORRECTION

PATENT NO. : 4,208,923

DATED : June 24, 1980

INVENTOR(S) : Seiichi Ikegami

It is certified that error appears in the above—identified patent and that said Letters Patent is hereby corrected as shown below:

Column 5, line 33 "a gear" should read -- said front gear means --,

Column 6, line 3 -- transmission -- should be inserted after "tractor",

Column 6, line 10 -- transmission -- should be inserted after "tractor",

Column 6, line 22 "inner" should read -- input --.

Signed and Sealed this

Twenty-first Day of July 1981

[SEAL]

Attest:

GERALD J. MOSSINGHOFF

Attesting Officer

Commissioner of Patents and Trademarks